Figure 1:
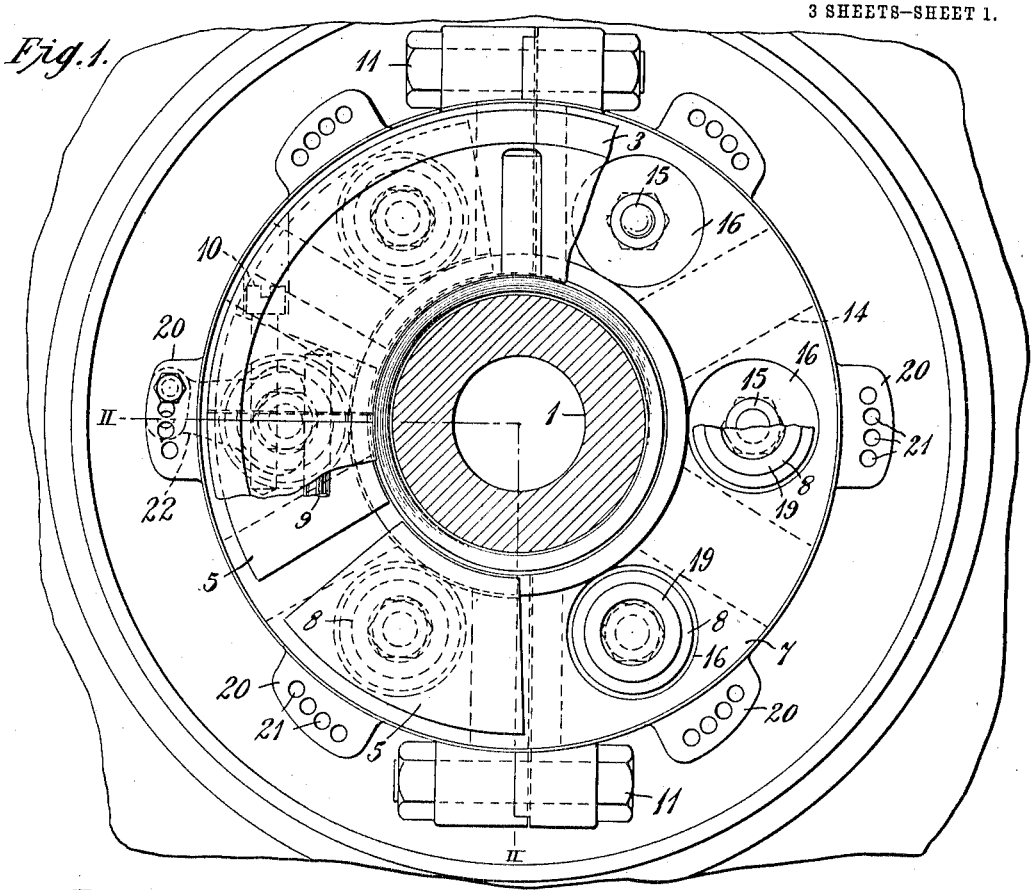

A. KINGSBURY.
THRUST BEARING.
APPLICATION FILED JULY 19, 1912.

1,102,276.

Patented July 7, 1914.

3 SHEETS—SHEET 1.

WITNESSES:
Fred H. Miller
D. H. Mace

INVENTOR
Albert Kingsbury
BY R. J. Barlow
ATTORNEY

A. KINGSBURY.
THRUST BEARING.
APPLICATION FILED JULY 19, 1912.

1,102,276.

Patented July 7, 1914.
3 SHEETS—SHEET 2.

WITNESSES:
Fred H. Miller
D. H. Mace

INVENTOR
Albert Kingsbury
BY R. J. Barbour
ATTORNEY

A. KINGSBURY.
THRUST BEARING.
APPLICATION FILED JULY 19, 1912.

1,102,276.

Patented July 7, 1914.

3 SHEETS—SHEET 3.

WITNESSES:
Fred H. Miller
D. H. Mace

INVENTOR.
Albert Kingsbury
BY
ATTORNEY.

UNITED STATES PATENT OFFICE.

ALBERT KINGSBURY, OF PITTSBURGH, PENNSYLVANIA.

THRUST-BEARING.

1,102,276.  Specification of Letters Patent.  Patented July 7, 1914.

Application filed July 19, 1912. Serial No. 710,496.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Thrust-Bearings, of which the following is a specification.

My invention relates to thrust bearings which are adapted to operate under relatively high thrust pressures and it has special reference to such as comprise a plurality of radial shoes arranged to maintain a film of lubricating fluid between the coöperating bearing surfaces.

One object of my invention is to provide, in a bearing of the class above indicated, simple and effective means for supporting the bearing shoes whereby deflection or distortion of the bearing surfaces is avoided and the cost for repairs and renewals materially reduced.

Other objects will be set forth hereinafter.

In Patent No. 947,242, granted January 25, 1910, on an application filed by me on May 20, 1907, I have shown and described a thrust bearing which operates successfully at relatively high speeds and under very high pressures. When a bearing of this character is at rest, the bearing surfaces of the shoes are in engagement with the surface of a coöperating bearing member, but when the bearing is in service and one of the parts is rotating, the shoes assume slightly tilted positions, by reason of the wedging action of the oil or other lubricating fluid in which the bearing surfaces are immersed. The shoes are pivotally supported in order to permit them to tilt. If the pivotal supporting surfaces are made of large area in order to distribute the support and thus minimize the elastic deflection of the shoes, there is ordinarily considerable friction between them and the shoes do not tilt readily when the movable member of the bearing is put into motion. On the other hand if the pivotal mounting is made of small area to permit the shoe to tilt readily, the bearing surfaces of the shoe are liable to become distorted, because of the relatively high pressures to which they are subjected.

According to my present invention, I interpose a supporting member between each shoe and its supporting pivot, which is provided with a suitable projection or projections on which the shoe is mounted. The projections on which the shoe is supported are so arranged and distributed as to minimize the deflection of the shoe, and the intermediate supporting member may become materially distorted without permitting the deflection or in any way affecting the action of the shoe. In addition to the foregoing, I provide, in the preferred arrangement of my invention, independent adjusting means for determining the positions of the several shoes.

Figure 2:
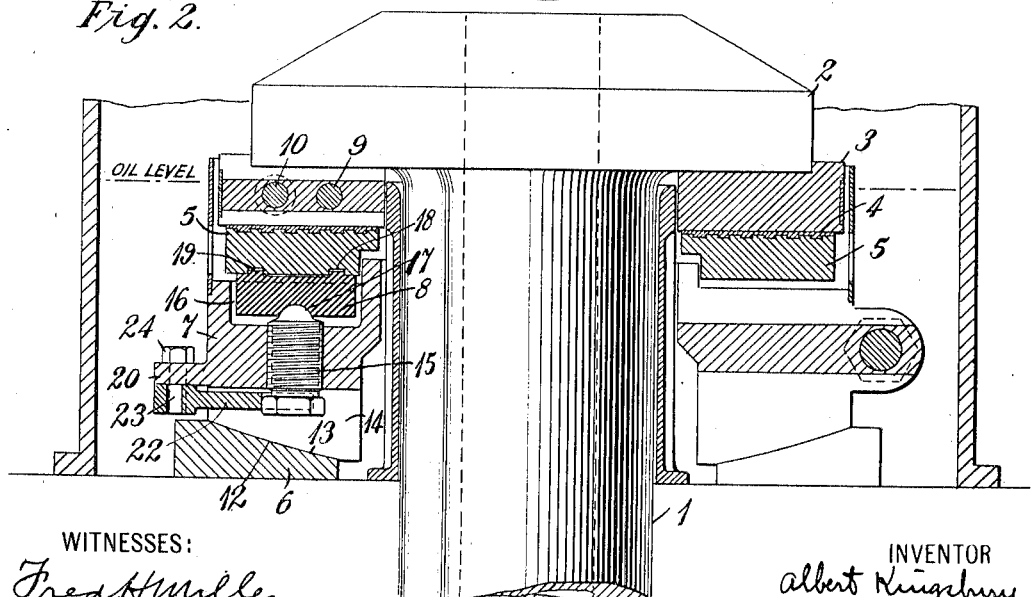
Figure 3:
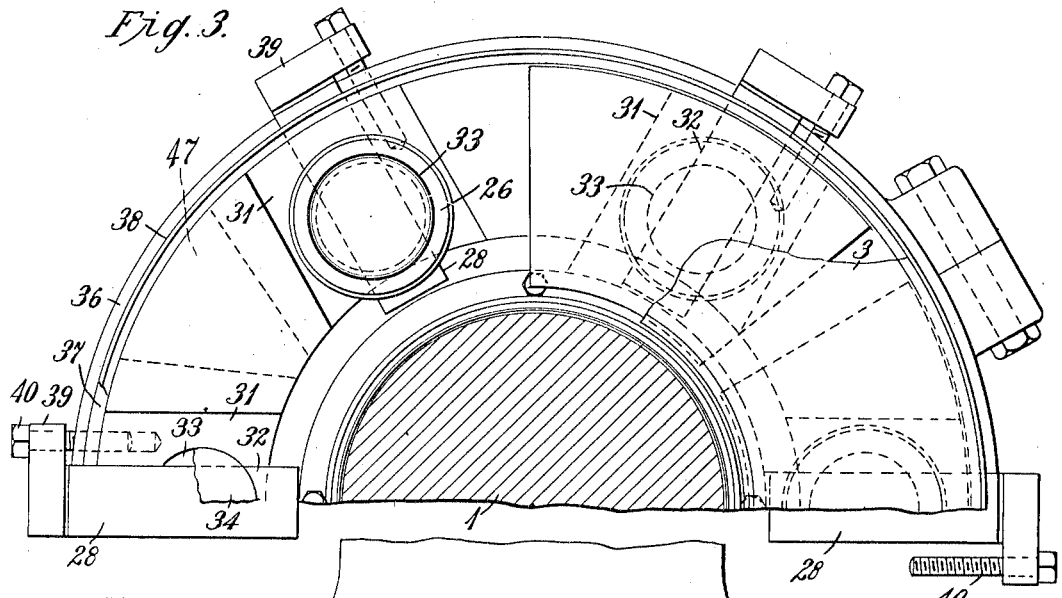
Figure 4:
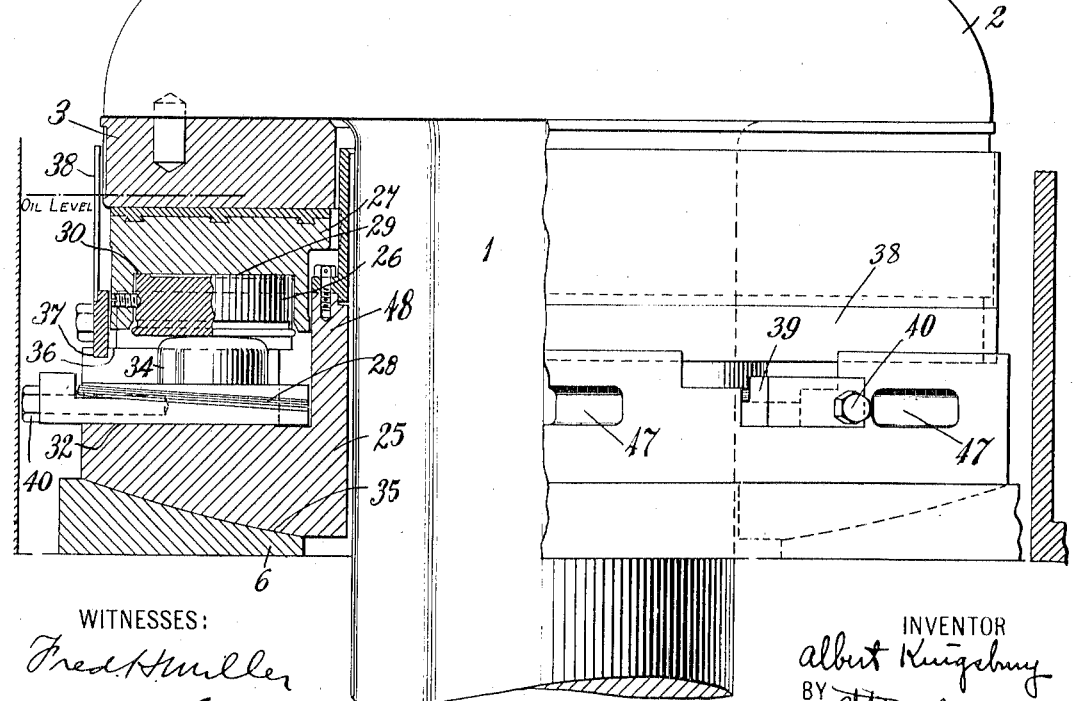
Figure 5:
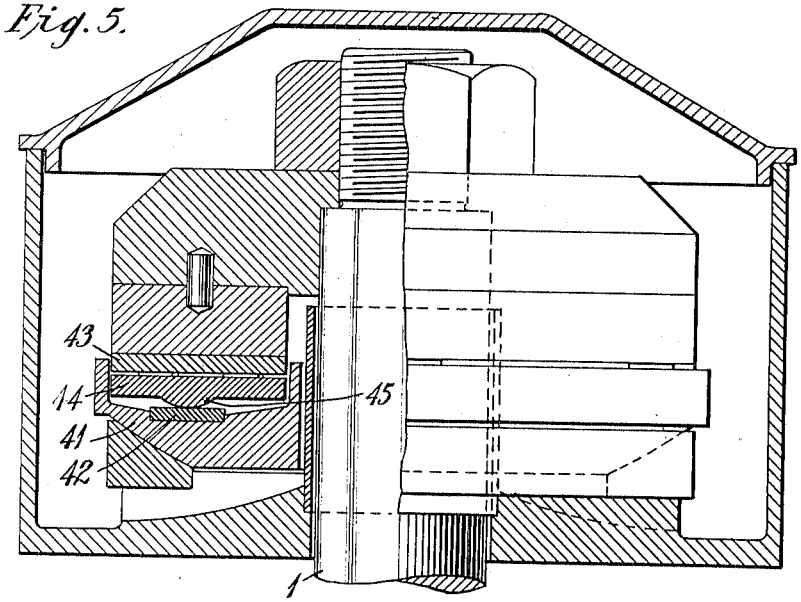
Figure 6:
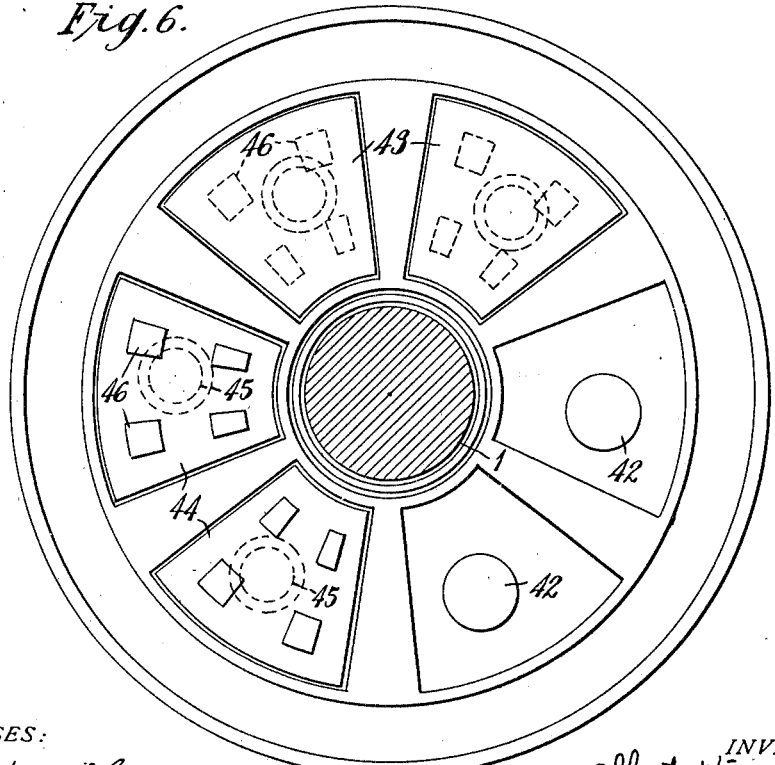

Figure 1 of the accompanying drawings is a partial plan view, with certain of the parts broken away to disclose the bearing shoes and their supports, of a thrust bearing structure embodying my invention. Fig. 2 is a sectional elevation, on the line II—II of Fig. 1, Figs. 3 and 4 are views corresponding to Figs. 1 and 2 of a modified bearing structure embodying my invention. Fig. 5 is a partially sectional elevation, and Fig. 6 is a plan view, with certain of the parts removed, of another modification of my invention.

Referring to Figs 1 and 2 of the drawings, a shaft or spindle 1, having an enlargement or flange 2, is supported by a thrust bearing structure comprising a ring 3, which forms a part of the enlargement 2 and has a bearing surface 4, radial bearing shoes 5, a stationary base 6, a supporting ring 7 pivotally mounted thereon and interposed carriers 8 on which the shoes 5 are mounted. The ring 3 is preferably made in two parts so that it may be easily removed and replaced, the relative positions of the parts being maintained by clamping screws 9 and 10. The supporting ring 7 is also preferably divided to facilitate assembling the device, the parts being secured together by bolts 11. The supporting ring 7 is provided with a convex spherically curved surface 12 which rests upon a correspondingly curved concave surface 13 of the base 6. The supporting ring is notched to provide pockets 14 which correspond in number and location to the shoes 5. The upper surface of the ring 7 is provided with a series of recesses 16 into which the carriers 8 are loosely fitted. The recesses are opposite the pockets 14 and screws 15 extend from the pockets through tapped holes in the ring 7 into the recesses 16. The carriers 8 are supported by the screws 15 and are provided with concave spherically curved recesses 17 which engage correspondingly curved ends of the screws. The bottom surface of each of the shoes 5 is provided with an annular slot 18 which engages a corresponding projection 19 from the upper surface of the carrier upon which it is mounted, the arrangement of parts being such that the bottom surface of the shoe only engages the carrier beyond the annular projection 19. By this means the tendency above referred to for the shoe to become distorted when the bearing is called upon to sustain very high pressures, is avoided.

By reason of the engagement of the projection 19 with the groove 18 of the shoe, the two parts act substantially as if they were integral parts of the same shoe, except that the carriers may become considerably distorted without permitting any distortion of the bearing surfaces of the shoes. The recesses 16 are sufficiently large to permit considerable freedom of movement of the carriers and the shoes which they support, but, at the same time, the carriers conform to the recesses sufficiently to prevent them from rotating about their vertical axes. The inner walls of the recesses 16 extend above the carriers 8 and close to the inner edges of the shoes so that they are thus prevented from rotating relative to the carriers. The ring is provided with a plurality of projections 20 which are opposite the pockets 14 and are each provided with a plurality of holes 21, the center lines of which lie in an arc of a circle transcribed about the vertical axis of the supporting bolt which is located in the same notch. The head of each of the screws 15 is provided with a locking wrench 22 having tapped holes 23. A bolt 24 extends through one of the holes 21 in each of the projections 20 and engages one of the tapped holes in the wrench in order to support it and prevent the screw from rotating after it has been adjusted. The ring 7 may be a part of the base 6 instead of pivotally supported upon it, but I prefer to utilize the arrangement illustrated.

In operation, the load may be uniformly distributed upon the several shoes by suitably adjusting the supporting screw 15, but, at the same time, the pivotal mounting between the supporting ring 7 and the base 6 is desirable in order to maintain a uniform pressure if the shoes wear, or if the shaft or spindle 1 falls out of alinement.

Referring to Figs. 3 and 4 of the drawings, in which corresponding parts are referred to by the same reference characters, a supporting ring 25, supporting blocks 26, bearing shoes 27 and wedges 28 are substituted respectively for the ring 7, the blocks 8, the shoes 5 and the adjusting screws 15 of Figs. 1 and 2. The bottom surface of each of the shoes 27 is provided with a cylindrical recess 29 in which the supporting blocks 26 are located. The top surfaces of the blocks 26 are recessed to provide annular projections 30 which constitute the supports on which the shoes rest. The arrangement of parts is such that the shoes are supported at a material distance from their centers and, consequently, all danger of their bearing surfaces being seriously distorted, is avoided. At the same time, there is no possibility of improper lateral adjustment between the shoes and their supporting blocks, since the blocks are set in the recesses 29. The ring 25 is notched to provide a plurality of radial pockets 31 which correspond in number and location to the shoes 27, a groove 32 being provided in the bottom of each pocket to receive one of the wedges 28. A hardened steel button or plug 34 is seated in each of the pockets 31 on the wedge located therein, the pocket being notched at 33 on each side of the groove 32 to receive the button or plug and to guide its up and down movement when the wedge is adjusted. The top surface of each of the buttons or plugs 34 is spherically curved and engages the plane bottom surface of the supporting block 26 which is mounted directly upon it. The ring 25 is preferably provided with a spherically curved bottom surface 35 corresponding to the surface 12 of the ring 7 which engages a correspondingly curved concave surface of the base 6 on which it is mounted. Between the pockets 31, the ring 25 is notched at its top outer edge to provide a segmental annular shoulder 36 in which is an annular slot 37. A continuous retaining ring 38 which may of course be made in sections, is set in the groove 37 and is bolted to the ring between the pockets. The width of the ring 38 is sufficient to hold the shoes 27 in position and prevent their becoming misplaced by moving radially outward, without interfering with pivotal movements for which provision is made by the spherically curved supporting surface of the buttons or plugs 34. The wedges 28 are each provided with a projection 39 which extends above and to one side of the tapered body of the wedge. A bolt 40 extends through a suitable hole in the projection 39 and is screwed into the ring 25 in a radial direction whereby the position of the wedge may be determined by the setting of the bolt.

The operation of the bearing is similar to that of Figs. 1 and 2, except that the height of the shoes is independently adjusted by means of the wedges 28 instead of by the screws 15. Radial holes 47 are provided in the ring 25 in order to permit oil or other lubricating fluid to circulate inwardly through the ring, upwardly adjacent to a flange projection 48 thereof and outwardly between the bearing surfaces.

Referring to Figs. 5 and 6 of the drawings, in which like parts are indicated by the same reference characters, a supporting ring 41 is here substituted for the ring 7 and is provided with a plurality of hardened steel blocks 42 on which shoes 43 which are substituted for the shoes 5 of Fig. 1, are mounted, individual supporting members 44, being interposed between the shoes and the hardened blocks. The members 44 are provided with spherical projections 45 which are seated on the hardened steel blocks and with a series of upwardly extending projections or pads 46 on which the shoes 43 rest. The pads or projections 46 are so placed as to avoid the possibility of the shoes becoming greatly deflected under heavy pressures, while, at the same time, the spherical projections resting on the steel blocks, enable the shoe and the members 44, which act together as a unitary structure, to tilt and assume the most effective position in service. If the members 44 become deflected somewhat, it will not in any way affect the action of the bearing or distort the shoes 43.

In the structures illustrated and particularly in that of Figs. 5 and 6, the members which constitute the shoes are very simple and may be easily replaced if they become worn.

Structural variations may be effected within the spirit and scope of my invention, and I desire that only such limitations be imposed as are indicated by the appended claims.

I claim as my invention:

1. A thrust bearing comprising a movable member having a bearing surface, a plurality of relatively stationary bearing shoes coöperating therewith, a supporting member therefor, and an interposed carrier for each shoe tiltingly mounted on the supporting member and arranged to prevent the distortion of the shoe.

2. A thrust bearing comprising a plurality of contact shoes, a relatively stationary base and an interposed supporting block for each shoe tiltingly mounted on the base.

3. A thrust bearing comprising a plurality of bearing shoes, a relatively stationary base and an interposed carrier for each shoe tiltingly mounted on the base and arranged to support the shoe at a distance from its pivotal axis.

4. A bearing comprising a relatively rotatable bearing ring, a relatively stationary base, a plurality of radial shoes engaging the ring and an independently adjustable means between the base and each of the shoes, tiltingly supported on the base.

5. A bearing comprising a relatively rotatable member having a plane bearing surface, a relatively stationary base, a supporting ring pivotally mounted on the base, carrier blocks tiltingly mounted on the ring, and a plurality of radial contact shoes severally mounted on the carrier blocks, each shoe and its carrier block being independently adjustable toward and away from the bearing surface of the rotatable member.

6. A thrust bearing comprising a relatively rotatable member having a bearing surface, a plurality of relatively stationary tiltingly supported radial bearing shoes and rigid means for independently adjusting the shoes toward and away from the bearing surface of the rotatable member.

7. A bearing comprising a plurality of radial shoes each having a recess on the opposite side from its bearing surface, a carrier located in the recess, and independently adjustable means on which the carrier is tiltingly mounted.

8. A bearing comprising a plurality of radial shoes each having a recess on the opposite side from its bearing surface, a carrier located in the recess, and having a supporting surface near the walls of the recess, supporting means for the carrier having a convex spherical surface on which the carrier is mounted, and a wedge which is adapted to be adjusted to vary the position of the carrier and the shoe.

9. A thrust bearing comprising a relatively stationary annular base having a concave, spherically curved annular surface, a shaft extending therethrough having a flange or enlargement, a plurality of radial bearing shoes coöperating with the annular member, independent carriers for the several shoes, each having an annular projection on which one of the shoes rests and means for maintaining a fixed relation between each shoe and its support, an interposed ring, between the annular base and the carriers, and adjustable means for independently and pivotally supporting the carriers.

10. A thrust bearing comprising a relatively stationary base having a concave, spherically curved surface, a shaft having an annular bearing member, a plurality of radial bearing shoes coöperating with the bearing member of the shaft, a supporting ring pivotally seated on the base and having a plurality of independently adjustable projections and a plurality of carriers tiltingly mounted on the projections and having upwardly extending projections for supporting the shoes at a material distance from their centers.

11. A thrust bearing comprising a relatively stationary annular base having a concave spherically curved annular surface, a shaft extending therethrough having a flange or enlargement and a bearing ring secured thereto, a plurality of radial bearing shoes coöperating with the bearing ring, and independently adjustable tiltingly supported carriers for the shoes mounted on the base.

In testimony whereof, I have hereunto subscribed my name this 8th day of July 1912.

ALBERT KINGSBURY.

Witnesses:
R. J. DEARBORN,
B. B. HINES.